United States Patent [19]

Higbee et al.

[11] Patent Number: 4,840,324
[45] Date of Patent: Jun. 20, 1989

[54] SEAT BELT RETRACTOR HAVING A COMFORT MECHANISM WITH FULL MEMORY AND SLACK SET

[75] Inventors: Wallace C. Higbee, Romeo; Barney J. Bauer, Grosse Pointe Woods, both of Mich.

[73] Assignee: TRW Vehicle Safety Systems Inc., Lyndhurst, Ohio

[21] Appl. No.: 138,838

[22] Filed: Dec. 28, 1987

[51] Int. Cl.⁴ .............................................. B60R 22/34
[52] U.S. Cl. .................................................. 242/107.6
[58] Field of Search .......................... 242/107.6, 107.7; 280/807, 808, 806; 297/475–478

[56] References Cited

U.S. PATENT DOCUMENTS

| | | |
|---|---|---|
| 3,682,412 | 8/1972 | Kuszynski . |
| 3,700,184 | 10/1972 | Francis .......................... 242/107.6 X |
| 3,912,035 | 10/1975 | Ulert ............................ 242/107.6 X |
| 4,153,274 | 5/1979 | Rogers, Jr. et al. ............. 242/107.7 |
| 4,494,709 | 1/1985 | Takada ............................. 242/107.6 |
| 4,655,312 | 4/1987 | Frantom et al. . |
| 4,659,108 | 4/1987 | Sack et al. . |

OTHER PUBLICATIONS

Hunter Spring Bulletin 310-67 (Date Unknown).

Primary Examiner—John M. Jillions
Attorney, Agent, or Firm—Tarolli, Sundheim & Covell

[57] ABSTRACT

An apparatus comprising a spindle on which belt webbing is wound. The spindle is supported for rotation in belt retraction and belt withdrawal directions. The spindle is biased to rotate in the belt retraction direction. The apparatus also includes a manually movable member. The spindle is rotated in the belt withdrawal direction in response to movement of the manually movable member to pay out a predetermined amount of belt webbing from the spindle. Thereafter, rotation of the spindle in the belt retraction direction is blocked.

20 Claims, 5 Drawing Sheets

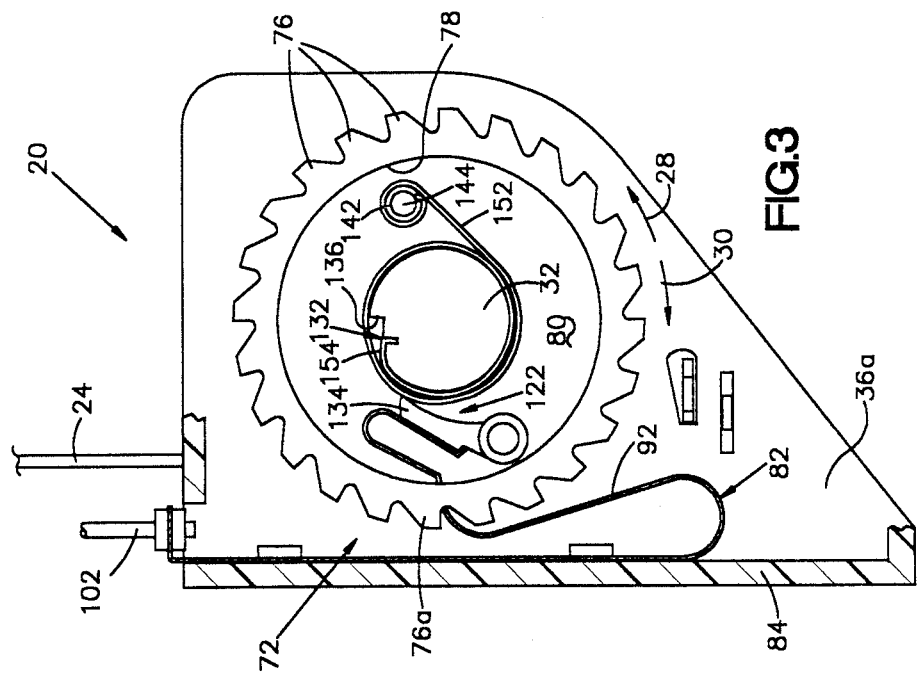
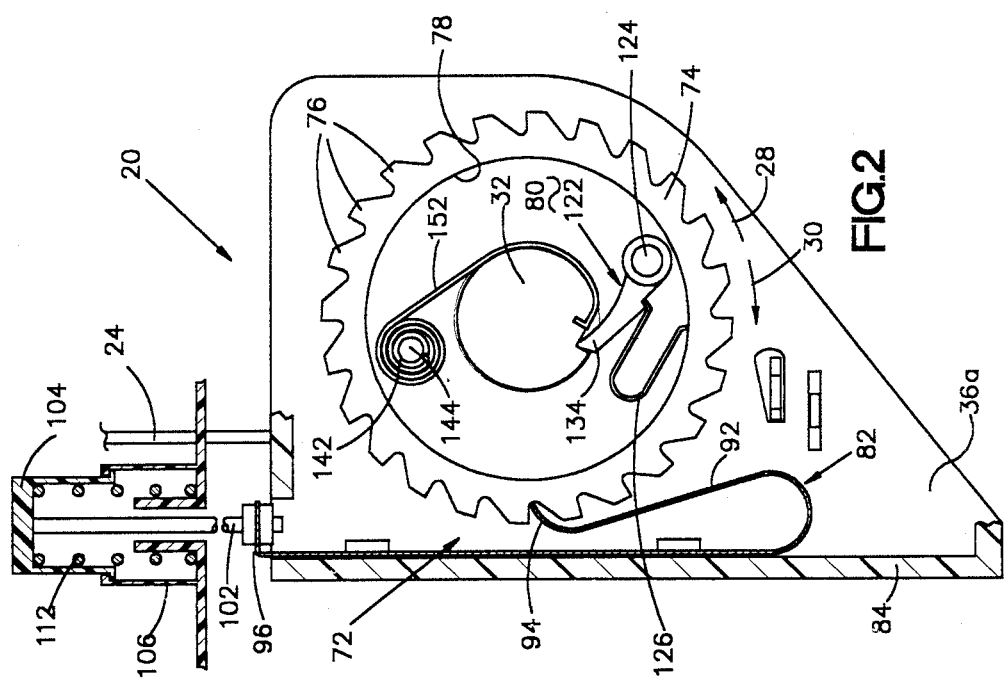

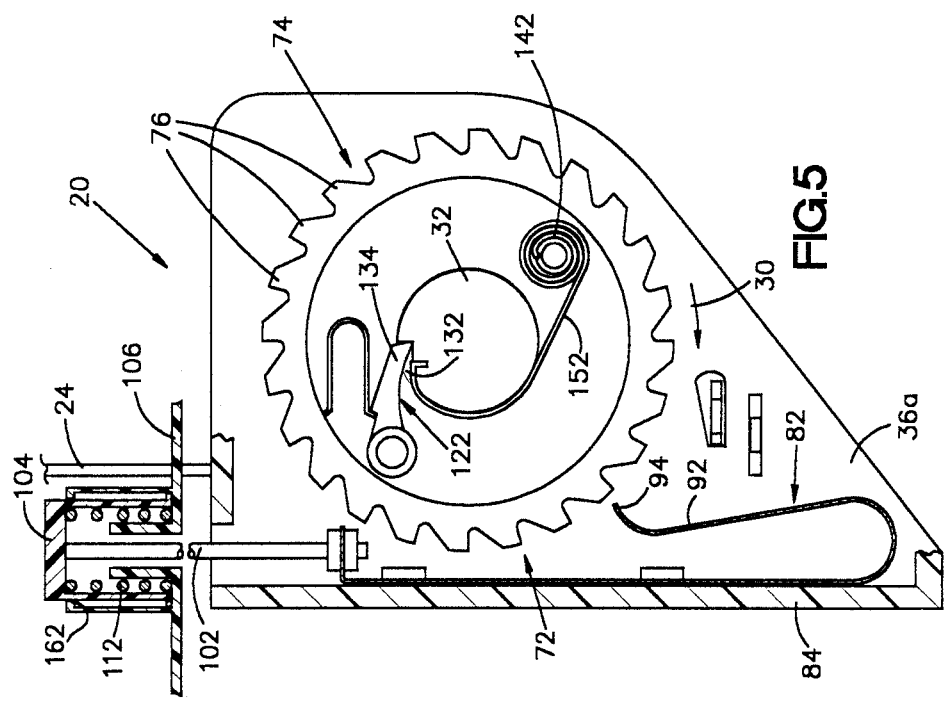
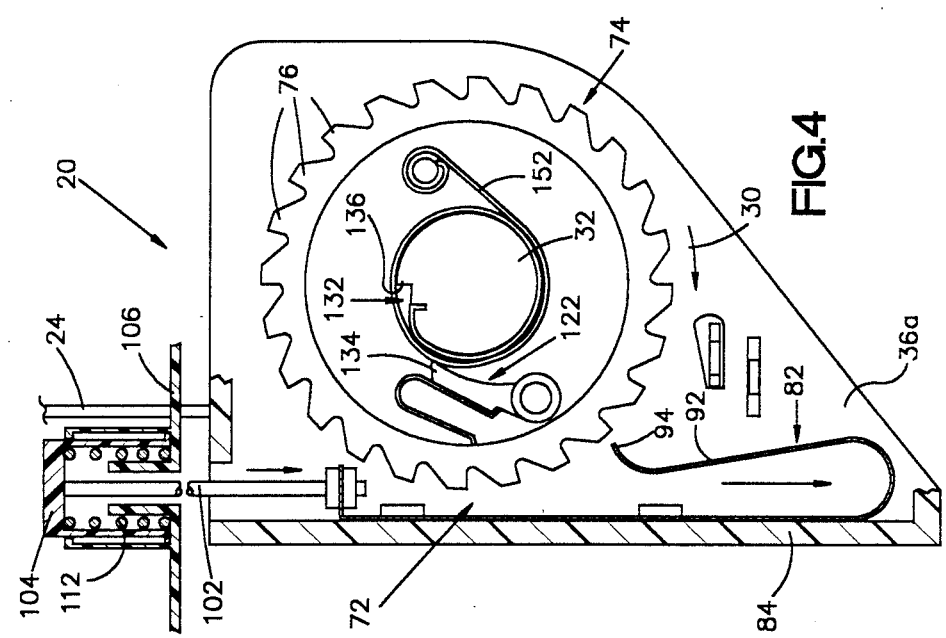

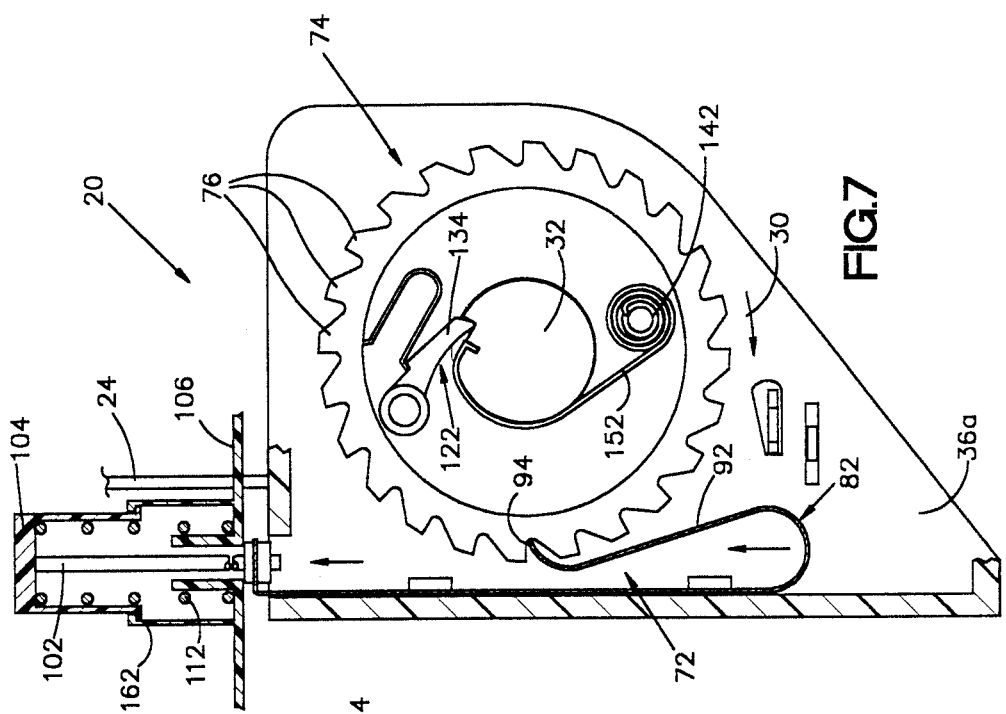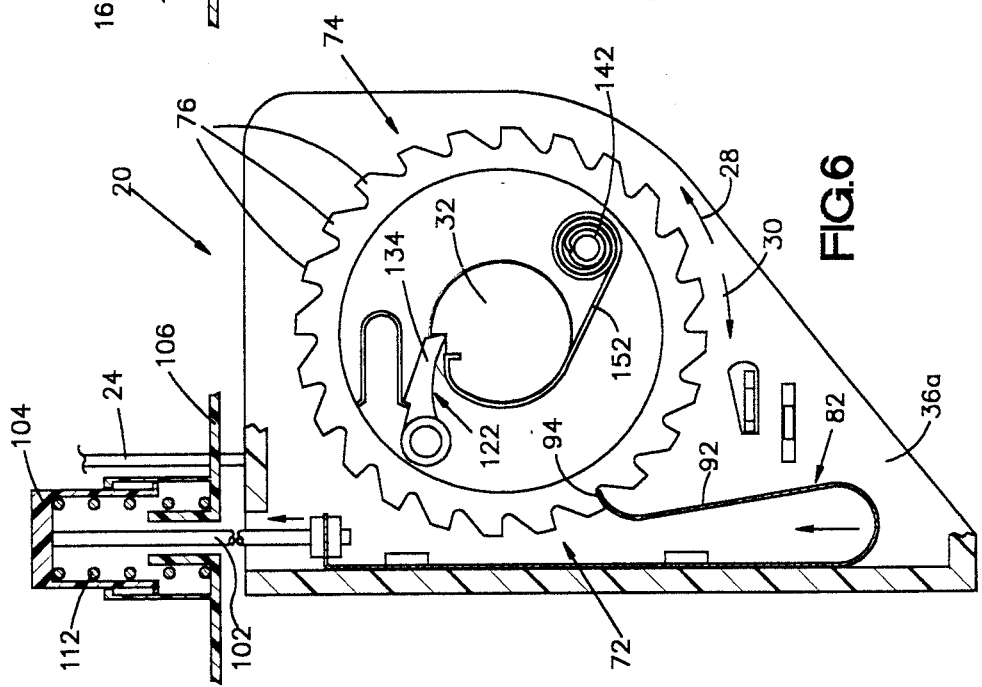

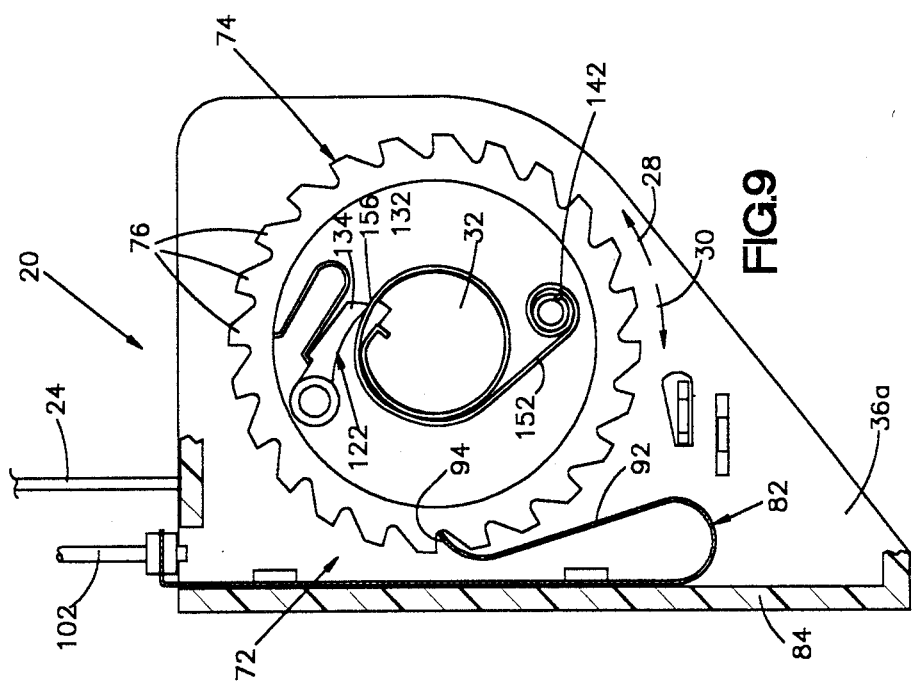
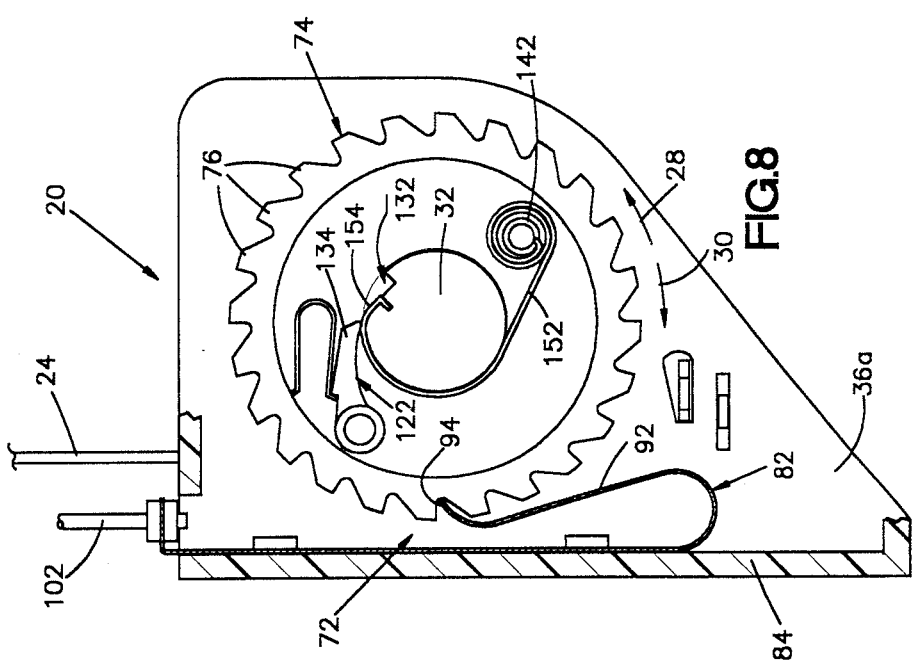

SEAT BELT RETRACTOR HAVING A COMFORT MECHANISM WITH FULL MEMORY AND SLACK SET

BACKGROUND OF THE INVENTION

1. Technical Field

The present invention relates to a seat belt retractor for use in a vehicle. Particularly, the present invention relates to a seat belt retractor having a comfort mechanism to eliminate the force exerted by seat belt webbing against a vehicle occupant.

2. Description of the Prior Art

Seat belt retractors having comfort mechanisms for eliminating the force exerted by seat belt webbing against a vehicle occupant are known. One such seat belt retractor is disclosed in U.S. Pat. No. 3,682,412. The seat belt retractor disclosed in U.S. Pat. No. 3,682,412 includes seat belt webbing wound on a spool. The spool is supported for rotation in belt withdrawal and belt retraction directions. A return spring biases the spool to rotate in the belt retraction direction. The biasing force of the return spring tends to pull the belt webbing against the occupant, which may cause discomfort to the occupant. To avoid causing such discomfort, the retractor includes a comfort mechanism which, when actuated, blocks rotation of the spool in the belt retraction direction so the belt webbing is not pulled against the occupant.

The comfort mechanism disclosed in U.S. Pat. No. 3,682,412 is manually set. When the belt webbing is withdrawn from the spool and buckled around the occupant, the return spring rotates the retractor spool in the belt retraction direction to pull the belt webbing against the vehicle occupant. The vehicle occupant then withdraws the belt webbing a relatively small amount to establish slack in the webbing and actuates the comfort mechanism by moving a handle. Rotation of the spool in the belt retraction direction is then blocked and the slack in the belt established by the occupant is maintained.

In a nonemergency situation, if the occupant moves forward from an initial position, the slack in the belt webbing is taken up and the webbing is withdrawn from the spool and follows movement of the occupant. When the occupant moves back to the initial position, the spool rotates in the belt retraction direction, due to the bias of the return spring, to a position in which the slack in the belt webbing is reestablished. Thus, the retractor has a "memory" so that the amount of slack in the belt webbing set by the occupant is reestablished. The comfort mechanism includes a ratchet wheel connected to the spool. A pawl is pivotable into engagement with a tooth on the ratchet wheel to block rotation of the spool in the belt retraction direction. After slack is established in the webbing, the handle is manually moved to pivot the pawl into engagement with a tooth on the ratchet wheel. A spring is connected at one end to the pawl and at its other end to a shaft. When the belt webbing is withdrawn, for example, due to movement of the occupant forward from the seat back, gears rotate the shaft in one direction and the spring pivots the pawl away from engaging the tooth on the ratchet wheel. When the belt webbing then retracts onto the spool, the gears rotate the shaft in an opposite direction and the spring pivots the pawl toward the ratchet wheel to engage the tooth it previously engaged on the ratchet wheel and to reestablished the slack.

SUMMARY OF THE INVENTION

The seat belt retractor of the present invention includes a spindle on which belt webbing is wound. The spindle is supported for rotation in belt retraction and belt withdrawal directions. The spindle is biased to rotate in the belt retraction direction. The seat belt retractor of the present invention also includes a comfort mechanism which includes a manually movable member which when moved (i) effects rotation of the retractor spindle to pay out a predetermined amount of belt webbing to establish slack in the belt webbing and (ii) actuates the comfort mechanism to block the spindle from rotating in the belt retraction direction. The comfort mechanism has a "memory" which enables the predetermined amount of slack in the belt webbing to be reestablished in the event the occupant moves forward and the slack is taken up.

The comfort mechanism of the present invention includes a member supported for movement relative to the spindle and a mechanism which when actuated blocks movement of the member. A latch is carried by the member. The latch is movable relative to the member between a first position blocking rotation of the spindle in the belt retraction direction and a second position enabling rotation of the spindle in the belt retraction direction.

A stub shaft is connected to and rotatable with the spindle. A groove in the stub shaft receives a portion of the latch to block rotation of the stub shaft and, thus, the spindle in the belt retraction direction. The latch is moved away from the stub shaft during rotation of the spindle and stub shaft in the belt withdrawal direction through an angular displacement. Upon rotation of the spindle and stub shaft in a belt retraction direction through the same angular displacement, the latch moves into the groove in the stub shaft to block further rotation of the spindle and stub shaft in the belt retraction direction. The member supported for movement relative to the spindle is preferably a drum rotatably mounted on the stub shaft connected to the spindle. An elongate spring is carried by the drum and connected to the stub shaft adjacent the groove. The elongate spring winds onto the stub shaft during rotation of the spindle and stub shaft in the belt withdrawal direction. The spring also engages the latch to move the latch in a direction away from the groove in the stub shaft. During subsequent revolutions of the spindle and stub shaft, the elongate spring covers the groove to prevent the latch from entering the groove. When the spindle and stub shaft rotate in the belt retraction direction, the elongate spring unwinds from the stub shaft until the groove is uncovered to permit the latch to enter the groove. Rotation of the spindle in the belt retraction direction is blocked at the same position at which the slack was set by the vehicle occupant. Thus, the retractor has a "memory" so that the slack in the belt webbing set by the vehicle occupant is reestablished.

A plurality of teeth extend from the drum. A movable pawl member connected with the manually movable member has a portion for engaging one of the plurality of teeth on the drum. When the pawl member engages one of the plurality of teeth on the drum and moves in one direction, belt webbing is paid out to establish the predetermined amount of slack in the belt. When the pawl member engages one of the plurality of teeth on the drum and is blocked from movement, rotation of the drum in the belt retraction direction is blocked.

BRIEF DESCRIPTION OF THE DRAWINGS

Further features of the present invention will become apparent to those skilled in the art to which the present invention relates from reading the following specification with reference to the accompanying drawings, in which:

FIG. 2 is a view of the retractor of FIG. 1, taken approximately along line 2—2 of FIG. 1 and illustrating the comfort mechanism according to the present invention; and FIGS. 3-9 are views similar to FIG. 2 illustrating some of the parts of the comfort mechanism in different operational positions thereof.

DESCRIPTION OF A PREFERRED EMBODIMENT

Figure 1:
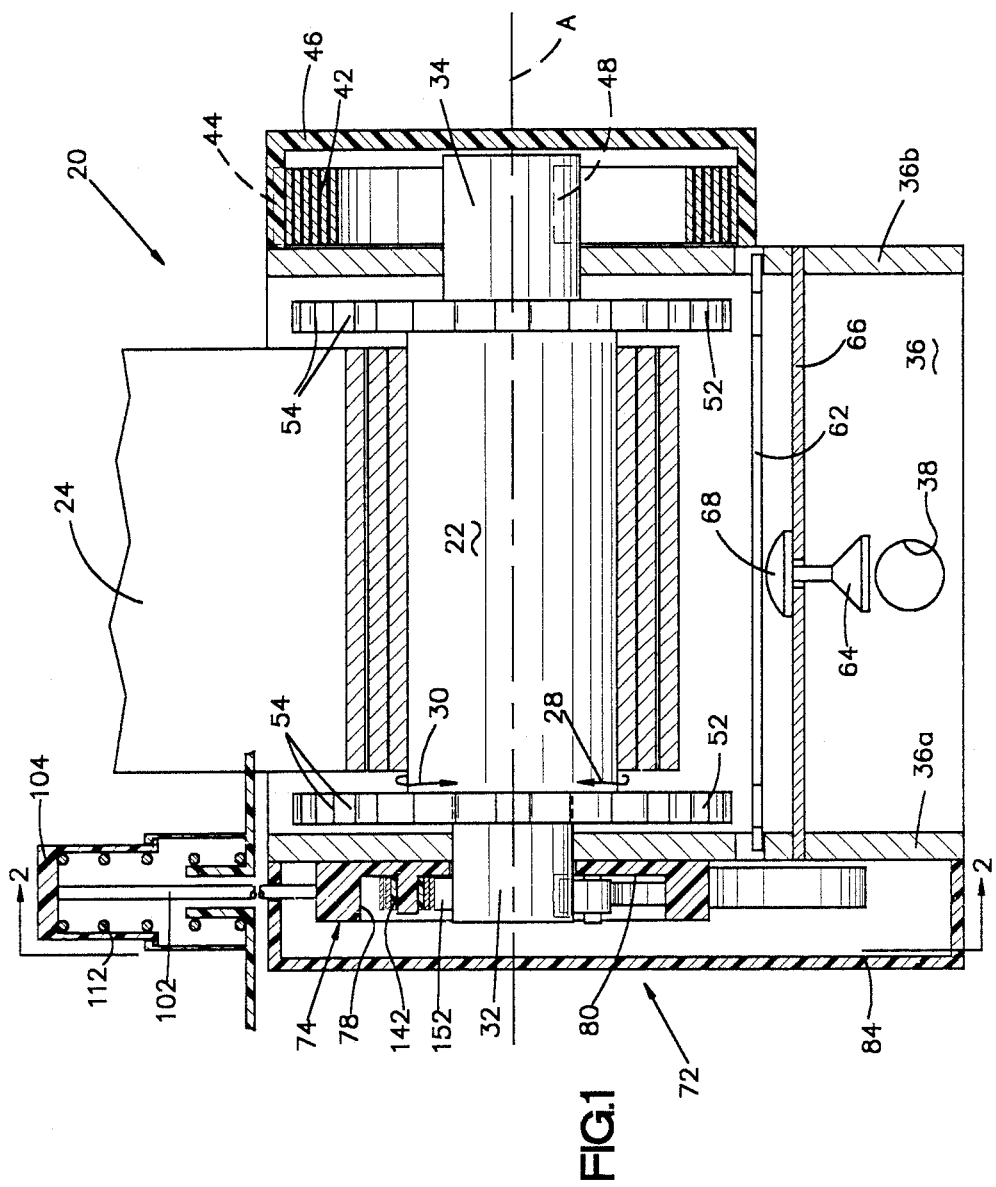
FIG. 1 is a view, partly in section, of a seat belt retractor embodying the present invention.

FIG. 1 illustrates a seat belt retractor 20 for use in an automotive vehicle. The seat belt retractor 20 includes a spool or spindle 22. A pair of stub shafts 32, 34 are connected to the spindle 22 and extend from axially opposite ends of the spindle. Each of the stub shafts 32, 34 is received in an opening in a respective side 36a, 36b of a frame 36 to support the spindle 22 for rotation. The spindle 22 is rotatable in a belt retraction direction 28 and a belt withdrawal direction 30. An opening 38 in the frame 36 receives a fastener (not shown) to connect the retractor 20 to the vehicle.

Seat belt webbing 24 is connected at one end to the spindle 22 and is wound on the spindle for storage. The belt webbing 24 is extendible about an occupant of the vehicle. A return spring 42 biases the spindle 22 to rotate in the belt retraction direction 28 tending to pull the belt webbing 24 against the vehicle occupant. The return spring 42 has one end portion 44 connected top spring cover 46 which is attached to the frame side 36b. Another end portion 48 of the return spring 42 is connected to the stub shaft 34.

Two ratchet wheels 52 are connected to the spindle 22, one adjacent each frame side 36. A plurality of ratchet teeth 54 extend radially outwardly from each of the ratchet wheels 52 and are equally spaced about the outer periphery of the ratchet wheel. A pawl 62 extends between and is supported for pivotal movement by the sides 36a, 36b of the frame 36. A pendulum-type inertia member 64 is supported for pivotal movement by a beam 66 extending between the sides 36a, 36b of the frame 36 adjacent the pawl 62. The inertia member 64 pivots relative to the beam 66 in response to acceleration or deceleration of the vehicle at a rate above a predetermined rate, as is known.

Upon pivotal movement of the inertia member 64, an upper portion 68 of the inertia member engages the pawl 62 and pivots the pawl towards the ratchet wheels 52. A ratchet tooth 54 on each of the ratchet wheels 52 engages the pawl 62 to block the spindle 22 from rotating in the belt withdrawal direction 30. It should be apparent that any known type of locking system may be used in the retractor 20 to prevent rotation of the spindle 22 in the belt withdrawal direction 30 in an emergency situation.

The retractor 20 also includes a comfort mechanism 72 (FIG. 2) located adjacent the frame side 36a. When actuated, the comfort mechanism 72 blocks rotation of the spindle 22 in the belt retraction direction 28 so the belt webbing is not pulled against the occupant by the spring 42. The comfort mechanism 72 includes a ratchet member or drum 74 supported for rotation by the stub shaft 32. A plurality of radially outwardly projecting teeth 76 are equally spaced about the outer periphery of the drum 74. The drum 74 also has an inner cylindrical surface 78 (FIG. 1) and a recessed planar surface 80 that extends radially from the inner cylindrical surface 78 toward the stub shaft 32.

The comfort mechanism 72 also includes a hook-shaped pawl member 82 (FIG. 2), which is supported for reciprocating movement by a portion 84 of the frame 36. The pawl member 82 is movable in a direction generally tangential to the outer periphery of the drum 74. The shorter leg 92 of the pawl member 82 is resiliently deflectable and movable toward and away from the drum 74. An end portion 94 of the leg 92 is engageable with one of the plurality of teeth 76 on the drum 74. The end portion 96 of the longer leg of the pawl member 82 is connected to one end portion of an elongate member 102. Axial movement of the member 102, thus, moves the pawl member 82.

The other end portion of the member 102 is connected to a manually movable member or button 104. The button 104 is supported for reciprocating movement in a frame 106 which is connectable with the vehicle. The button 104 may be located remotely from the retractor 20. The button 104 is biased by a spring 112 upwardly, as viewed in FIG. 2. The spring 112 biases the elongate member 102 and the pawl member 82 to a position in which the pawl member 82 engages a tooth 76 on the drum 74, as illustrated in FIG. 2, to block the drum from rotating in the belt retraction direction 28.

A latch 122 is supported for pivotal movement by a pivot pin 124 extending axially away from the surface 80 of the drum 74. A spring 126 biases the latch 122 to pivot towards the stub shaft 32. A groove 132 (best seen in FIG. 3) is formed in the outer surface of the stub shaft 32. The groove 132 extends in a direction generally parallel to the longitudinal central axis A (FIG. 1) of the spindle 22 and stub shaft 32. The groove 132 receives an end portion 134 of the latch 122. When the end portion 134 of the latch 122 engages a radially extending surface 136 of the groove 132 and the drum 74 is blocked from rotating, the spindle and stub shaft 32 are blocked from rotating in the belt retraction direction 28.

A spool 142 is supported on another pin 144 extending axially away from the surface 80 of the drum 74. The spool 142 is rotatable about the pin 144. The outer diameter of the spool 142 is smaller than the outer diameter of the stub shaft 32. An elongate flexible spring member 152, such as a known Negator spring manufactured by Hunter Spring Company, of Lansdale, Pennsylvania, is connected at one end to the spool 142 and at its other end to the stub shaft 32 adjacent the groove 132. The spring member 152 is baised to wind onto the spool 142, and thus biases the drum 74 to rotate in the belt withdrawal direction 30 about the stub shaft 32.

When the belt webbing 24 is fully retracted onto the spindle 22, the parts are in the position illustrated in FIG. 2. In use, the occupant withdraws the belt webbing 24 from the retractor 20. When the belt webbing 24 is withdrawn, the spindle 22 and stub shaft 32 rotate in the belt withdrawal direction 30, from the position illustrated in FIG. 2. The drum 74 is blocked from rotation by the pawl member 82 and thus the spindle 22 and stub shaft 32 rotate in the belt withdrawal direction 30 relative to the drum 74. When the drum 74 is blocked from rotating by the pawl member 82 and the stub shaft 32 rotates in the belt withdrawal direction 30, the spring member 152 winds off the spool 142 and onto the stub shaft 32.

When the spring member 152 winds onto the stub shaft 32, a portion 154 (FIG. 3) of the spring member 152 engages the end portion 134 of the latch 122 and moves the end portion of the latch out of the groove 132 in the stub shaft 32. During rotation of the spindle 22 and stub shaft 32 in the belt withdrawal direction 30 through subsequent revolutions, the spring member 152 covers the groove 132 so the latch 122 cannot enter the groove, as illustrated in FIG. 9. The spindle 22 and stub shaft 32 rotate a sufficient number of times so that a portion of the belt webbing 24 extends about the upper torso of the occupant and a tongue carried by the belt webbing is secured to a buckle, in a known manner. The return spring 42 then biases the spindle 22 and stub shaft 32 to rotate in the belt retraction direction 28 and the parts take a position such as illustrated in FIG. 3. At this time the belt webbing 24 is pulled against the upper torso of the occupant by return spring 42 and the spindle 22 and stub shaft 32 stop rotating in the belt retraction direction 28. To actuate the comfort mechanism 72, the button 104 is manually depressed to the position illustrated in FIG. 4. Depressing the button 104 forces the elongate member 102 to move downwardly and, in turn, forces the end portion 94 of the pawl member 82 to move in a direction away from the drum 74. The end portion 94 of the pawl member 82 disengages a tooth, such as tooth 76a (FIG. 3), on the drum 74. The drum 74 is then free to rotate due to the bias of the spring member 152. The drum 74 rotates relative tot he stub shaft 32 in the belt withdrawal direction 30, from the position illustrated in FIG. 4 to the position illustrated in FIG. 5. The spring member 152 unwinds from the stub shaft 32 during rotation of the drum 74 in the belt withdrawal direction 30 to uncover the groove 132. The end portion 134 of the latch 122 enters the groove 132 in the stub shaft 32.

The occupant then releases the button 104. The button 104, elongate member 102 and pawl member 82 move upwardly from their positions shown in FIG. 5 to the positions shown in FIG. 6, due to the bias of the spring 112. The end portion 94 of the pawl member 82 again engages a tooth 76 on the drum 74. The force of the spring 112 biasing the button 104, elongate member 102 and pawl member 82 upwardly is greater than the force of the return spring 42 tending to rotate the drum 74 in the belt retraction direction 28. Thus, the pawl member 82 moves further upwardly after engaging the drum 74 to the position illustrated in FIG. 7. During movement of the pawl member 82 from the position illustrated in FIG. 6 to the position illustrated in FIG. 7, the pawl member rotates the drum 74, latch 134, stub shaft 32 and spindle 22 in the belt withdrawal direction 30 an arcuate distance of approximately 30°. This rotation of the drum 74, stub shaft 32 and spindle 22 in the belt withdrawal 30 direction pays out a predetermined amount of belt webbing 24 to establish slack in the belt webbing.

Stops 162 on the frame 106 block the button 104, elongate member 102 and pawl member 82 from moving upwardly beyond the position illustrated in FIG. 7. The pawl member 82 now blocks the drum 74 from rotating in the belt retraction direction 28. The stub shaft 32 and the spindle 22 are also blocked from rotating in the belt retraction direction 28 because the end portion 134 of the latch 122 is received in the groove 132. Thus, the force of the return spring 42 does not act through the belt webbing 24 and against the occupant.

Movement by the occupant, during nonemergency situations, in a generally forward direction from an initial position a sufficient amount causes the belt webbing 24 to be withdrawn from the retractor 20. When the belt webbing 24 is withdrawn, the spindle 22 and stub shaft 32 rotate in the belt withdrawal direction 30 from the position illustrated in FIG. 7 to a position such as illustrated in FIG. 8. During this movement, the latch 122 is moved out of engagement with the groove 132 by the portion 154 of the spring member 152. The spindle 22 and stub shaft 32 may rotate further in the belt withdrawal direction 30 a plurality of revolutions until the seat belt webbing 24 is fully extended. During subsequent revolutions of the spindle 22 and stub shaft 32 in the belt withdrawal direction 30, other portions 156 (FIG. 9) of the spring member 152 extending over the groove 132 prevent the latch 122 from reentering the groove 132.

When the occupant then moves back to the initial position, the spindle 22 and stub shaft 32 rotate in the belt retraction direction 28 due to the bias of the return spring 42. The spring member 152 unwinds from the stub shaft 32 and onto spool 142, and the end portion 134 of the latch 122 is again received in the groove 132 so rotation of the spindle 22 and stub shaft 32 in the belt retraction direction 28 is again blocked. When this occurs, the amount of slack initially established in the belt webbing 24 is reestablished. Thus, the retractor 20 has a "memory" which enables the slack set by the occupant to be reestablished.

In an alernate embodiment of the present invention, not illustrated, push button 104 could be replaced by an electric actuator, such as a motor to push and pull the elongate member 102. The motor could be controlled remotely through the use of electrical switches. From the above description of the preferred embodiment of the invention, those skilled in the art will perceive improvements, changes and modifications. Such improvements, changes and modifications within the skill of the art are intended to be covered by the appended claims.

Having described a preferred embodiment of the invention we claim the following:

1. An apparatus comprising:
    a spindle having belt webbing wound thereon, said spindle being supported for rotation in belt retraction and belt withdrawal directions;
    spring means for biasing said spindle to rotate in the belt retraction direction;
    a manually movable member; and
    means responsive to movement of said manually movable member for rotating said spindle in the belt withdrawal direction to pay out a predetermined amount of belt webbing from said spindle and for thereafter blocking rotation of said spindle in the belt retraction direction, said means responsive to movement of said manually movable member comprising a ratchet member connectable with the spindle, a pawl member engageable with the ratchet member, and a spring which overcomes said spring means to move said pawl member and thereby rotate said ratchet member.

2. The apparatus set forth in claim 1 wherein said means responsive to movement of said manually movable member includes means for blocking rotation of said spindle in the belt retraction direction relative to said ratchet member and means for blocking movement of said pawl member in a position in which said pawl member engages said ratchet member to block rotation of said ratchet member and said spindle in the belt retraction direction.

3. The apparatus set forth in claim 2 wherein said means for blocking rotation of said spindle in the belt retraction direction relative to said ratchet member includes a latch carried by said ratchet member and having a portion movable to a position for blocking rotation of said spindle relative to said ratchet member in the belt retraction direction.

4. The apparatus set forth in claim 3 wherein said means for blocking rotation of said spindle in the belt retraction direction further includes a stub shaft connected to and rotatable with said spindle and means defining a groove in said stub shaft for receiving said portion of said latch.

5. The apparatus set forth in claim 4 further including a spring member for winding onto said stub shaft during rotation of said spindle in the belt withdrawal direction to engage said portion of said latch to move said latch out of said groove and to block said portion of said latch from reentering said groove during subsequent revolutions of said spindle in the belt withdrawal direction and for thereafter unwinding from said stub shaft during rotation of said spindle in the belt retraction direction to uncover said groove to allow said groove to receive said portion of said latch.

6. The apparatus set forth in claim 1 further including means for supporting said pawl member for movement in a direction tangential to said ratchet member.

7. An apparatus comprising:
a spindle with belt webbing wound thereon and supported for rotation in belt retraction and belt withdrawal directions;
a spring biasing said spindle to rotate in the belt retraction direction;
a stub shaft connected to and rotatable with said spindle;
a drum supported for rotation relative to said stub shaft;
first means for blocking rotation of said drum;
a latch carried by said drum and movable relative thereto;
second means on said stub shaft for receiving a portion of said latch to block rotation of said stub shaft in the belt retraction direction relative to said drum; and
third means for moving said latch away from said stub shaft during rotation of said stub shaft in the belt withdrawal direction through an angular displacement and for subsequently enabling said latch to move toward said stub shaft to block rotation of said stub shaft in the belt retraction direction relative to said drum after rotation of said stub shaft in the belt retraction direction back through said angular displacement.

8. The apparatus set forth in claim 7 wherein said third means comprises a spring member carried by said drum and connected at one end to said stub shaft adjacent said second means, said spring member winding onto said stub shaft during rotation of said stub shaft in the belt withdrawal direction to engage said latch and move said latch in a direction away from said second means.

9. The apparatus set forth in claim 8 wherein said spring member biases said drum to rotate in the belt withdrawal direction.

10. The apparatus set forth in claim 7 wherein said first means comprises a plurality of ratchet teeth extending from said drum and a pawl member having a portion movable towards and away from said drum for engaging one of said plurality of ratchet teeth on said drum.

11. The apparatus set forth in claim 7 wherein said second means comprises a groove in said stub shaft, said groove extending in a direction generally parallel to the longitudinal central axis of said spindle.

12. The apparatus set forth in claim 7 further including means on said drum for supporting said latch for pivotal movement towards and away from said stub shaft and means for biasing said latch to pivot towards said stub shaft.

13. An apparatus comprising:
a spindle with belt webbing wound thereon and supported for rotation in belt retraction and belt withdrawal directions;
means biasing said spindle to rotate in the belt retraction direction;
a member supported for movement relative to said spindle;
a latch carried by said member and movable relative thereto between a first position blocking rotation of said spindle in the belt retraction direction relative to said member and a second position enabling rotation of said spindle in the belt retraction direction relative to said member;
manually operable means having a first condition blocking movement of said member and a second condition allowing movement of said member; and
a spring member for biasing said member to a predetermined position relative to said spindle when said manually operable means is in said second condition and for moving said latch to the second position from the first position during rotation of said spindle in the belt withdrawal direction through an angular displacement and for subsequently enabling said latch to move back to said first position from the second position after rotation of said spindle in the belt retraction direction back through said angular displacement.

14. An apparatus comprising:
a spindle having belt webbing wound thereon, said spindle being supported for rotation in belt retraction and belt withdrawal directions;
spring means for biasing said spindle to rotate in the belt retraction direction;
a manually actuatable member; and
means responsive to actuation of said manually actuatable member for rotating said spindle in the belt withdrawal direction to pay out a predetermined amount of belt webbing from said spindle and for thereafter blocking rotation of said spindle in the belt retraction direction by said spring means, said means responsive to actuation of said manually movable member comprising a ratchet member connectable with the spindle, a pawl member engageable with the ratchet member and a spring which overcomes said spring means to move said pawl member and thereby rotate said ratchet member.

15. The apparatus set forth in claim 14 wherein said means responsive to actuation of said manually actuatable member includes means for blocking rotation of said spindle in the belt retraction direction relative to said ratchet member and means for blocking movement of said pawl member in a position in which said pawl member engages said ratchet member to block rotation of said ratchet member and said spindle in the belt retraction direction.

16. The apparatus set forth in claim 15 wherein said means for blocking rotation of said spindle in the belt retraction direction relative to said ratchet member includes a latch carried by said ratchet member and having a portion movable to a position for blocking rotation of said spindle relative to said ratchet member in the belt retraction direction.

17. The apparatus set forth in claim 16 wherein said means for blocking rotation of said spindle in the belt retraction direction further includes a stub shaft connected to and rotatable with said spindle and means defining a groove in said stub shaft for receiving said portion of said latch.

18. The apparatus set forth in claim 17 further including a spring member for winding onto said stub shaft during rotation of said spindle in the belt withdrawal direction to engage said portion of said latch to move said latch out of said groove and to block said portion of said latch from reentering said groove during subsequent revolutions of said spindle in the belt withdrawal direction and for thereafter unwinding from said stub shaft during rotation of said spindle in the belt retraction direction to uncover said groove to allow said groove to receive said portion of said latch.

19. An apparatus comprising:
a spindle having belt webbing wound thereon, said spindle being supported for rotation in belt retraction and belt withdrawal directions;
spring means for biasing said spindle to rotate in the belt retraction direction;
a manually movable member;
means connectable with said spindle for joint rotation therewith in response to movement of said manually movable member in one direction from an initial position; and
means for rotating said connectable means with said spindle in the belt withdrawal direction to pay out a predetermined amount of belt webbing from said spindle and for thereafter blocking rotation of said spindle in the belt retraction direction in response to movement of said manually movable member in a second direction opposite the one direction and toward the initial position.

20. An apparatus for use in protecting an occupant of a vehicle and comprising:
a spindle having belt webbing wound thereon, said spindle being supported for rotation in belt retraction and belt withdrawal directions;
spring means for biasing said spindle to rotate in the belt retraction direction;
a manually movable member having a portion for engagement by the hand of the vehicle occupant and to which a force is applied by the occupant to move said manually movable member; and
means for rotating said spindle in the belt withdrawal direction to pay out a predetermined amount of belt webbing from said spindle in response to movement of said manually movable member by the vehicle occupant engaging said portion and applying a force thereto and for thereafter blocking rotation of said spindle in the belt retraction direction.

* * * * *